(12) United States Patent
Stancu et al.

(10) Patent No.: US 7,615,887 B2
(45) Date of Patent: Nov. 10, 2009

(54) METHOD AND SYSTEM FOR OPERATING A POWER CONVERTER

(75) Inventors: Constantin C. Stancu, Anaheim, CA (US); Daniel L. Kowalewski, Redondo Beach, CA (US); Robert T. Dawsey, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 293 days.

(21) Appl. No.: 11/684,023

(22) Filed: Mar. 9, 2007

(65) Prior Publication Data

US 2008/0219032 A1 Sep. 11, 2008

(51) Int. Cl.
*H02J 1/12* (2006.01)
(52) U.S. Cl. .................. 307/46; 318/139; 307/10.1; 307/45

(58) Field of Classification Search ............... 318/109, 318/106, 139; 307/10.1, 46, 45; 320/118; 701/22, 99; 180/65.3, 65.8
See application file for complete search history.

(56) References Cited

U.S. PATENT DOCUMENTS

| | | | | |
|---|---|---|---|---|
| 6,795,756 | B1 * | 9/2004 | Zhang et al. | 701/22 |
| 7,138,730 | B2 * | 11/2006 | Lai | 307/82 |
| 7,183,728 | B2 * | 2/2007 | Kitajima et al. | 318/109 |
| 7,259,542 | B2 * | 8/2007 | Song | 323/282 |

* cited by examiner

*Primary Examiner*—Shawn Riley

(57) ABSTRACT

A method and system for operating a power converter having an electrical component and a switch coupled to a voltage source are provided. A signal is received that is representative of a desired current flow through the electrical component. A signal is generated that is representative of a difference between the desired current flow and an actual current flow through the electrical component. A duty cycle for the switch is calculated based on the signal representative of the difference and a voltage generated by the voltage source.

19 Claims, 4 Drawing Sheets

METHOD AND SYSTEM FOR OPERATING A POWER CONVERTER

TECHNICAL FIELD

The present invention generally relates to power converters, and more particularly relates to a method and system for operating a power converter.

BACKGROUND OF THE INVENTION

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Such vehicles, particularly fuel cell vehicles, often use two separate voltage sources (e.g., a battery and a fuel cell) to power the electric motors that drive the wheels. Power converters, such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The states of the transistors are regulated by electrical signals that dictate the "duty cycle" (i.e., on-time) for each transistor, which often change dynamically during the operation of the converter. The dynamic change of duty cycles required for proper operation of a particular converter is dependent on the particular characteristics of the vehicle in which the converter will be used (e.g., voltage source type, desired performance, etc.). Typically, the dynamic performance of the control of the duty cycles is dictated by the electrical components (e.g., inductors, capacitors, resistors, etc.), or the values of the electrical components, within the circuitry within the converter. Thus, in order to change the control dynamic performance of the duty cycles, the electrical components must be replaced. Replacement of the electrical components can increase the costs of manufacturing the automobile, especially if the automobile has been redesigned, and are difficult to make after the automobile has been sold, as the converter circuitry is not readily accessible.

Accordingly, it is desirable to provide a system and method for operating a power converter which allows the control dynamic performance of the duty cycles of the transistors within the converter to be changed without making hardware changes. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for operating a power converter having an electrical component and a switch coupled to a voltage source. A signal is received that is representative of a desired current flow through the electrical component. A signal is generated that is representative of a difference between the desired current flow and an actual current flow through the electrical component. A duty cycle for the switch is calculated based on the signal representative of the difference and a voltage generated by the voltage source.

An automotive drive system is provided. The system includes a power converter, having first and second switches and an inductor, configured to be coupled to a first voltage source and a second voltage source and a microprocessor in operable communication with the power converter. The microprocessor is configured to receive a signal representative of a desired current flow through the inductor, generate a signal representative of a difference between the desired current flow and an actual current flow through the inductor, and calculate respective first and second duty cycles for the first and second switches based on the signal representative of the difference and respective first and second voltages generated by the first and second voltage sources.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-4 are merely illustrative and may not be drawn to scale.

FIG. 1 to FIG. 4 illustrate a method and/or system for operating a power converter having an electrical component and a switch coupled to a voltage source. A signal is received that is representative of a desired current flow through the electrical component. A signal is generated that is representative of a difference between the desired current flow and an actual current flow through the electrical component. A duty cycle for the switch is calculated based on the signal representative of the difference and a voltage generated by the voltage source. A second duty cycle for a second switch coupled to the electrical component and a second voltage source may be calculated in a similar manner.

As will be described in greater detail below, in one embodiment, the electrical component is an inductor within a direct current-to-direct current (DC/DC) converter. The two voltages sources may include a battery and a fuel cell within a fuel cell powered automobile.

Figure 1:
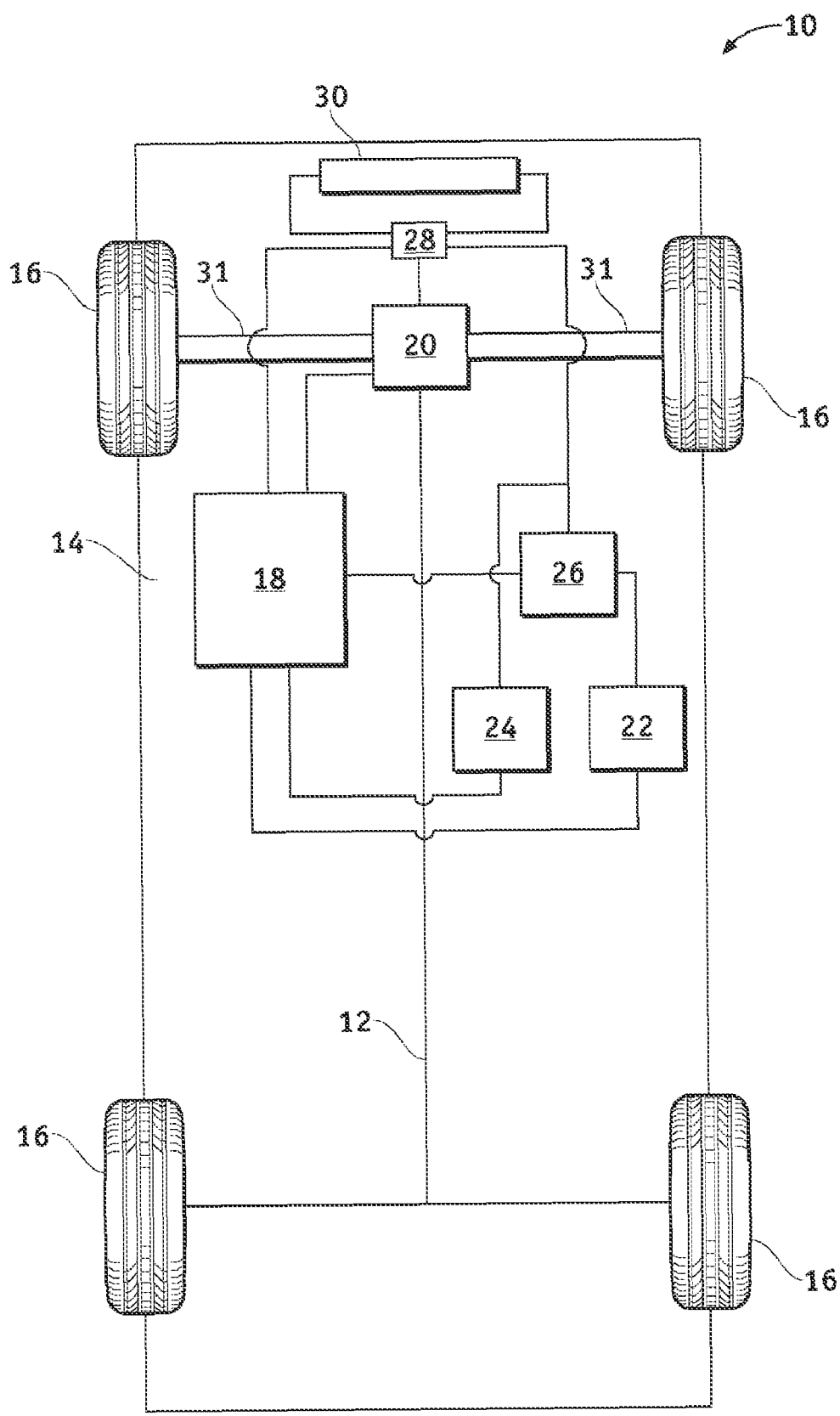
FIG. 1 is a schematic view of an exemplary automobile including a direct current-to-direct current (DC/DC) converter system, according to one embodiment of the present invention.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 is a fuel cell vehicle, and further includes an electric motor/generator (or "traction" motor) 20, a battery 22, a fuel cell power module (FCPM) 24, a DC/DC converter system 26, an inverter 28, and a radiator 30. Although not illustrated, the motor 20 includes a stator assembly (including conductive coils), a rotor assembly (including a ferromagnetic core), and a cooling fluid (i.e., coolant), as will be appreciated by one skilled in the art. The motor 20 may also include a transmission integrated therein such that the motor 20 and the transmission are mechanically coupled to at least some of the wheels 16 through one or more drive shafts 31.

As shown, the battery 22 and the FCPM 24 are in operable communication and/or electrically connected to the electronic control system 18 and the DC/DC converter system 26. Although not illustrated, the FCPM 24, in one embodiment, includes amongst other components, a fuel cell having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode, conducts the electrons back from the external circuit to the catalyst, where they can recombine with the hydrogen ions and oxygen to form water. The electrolyte, or proton exchange membrane, conducts only positively charged ions while blocking electrons, while the catalyst facilitates the reaction of oxygen and hydrogen.

Figure 2:
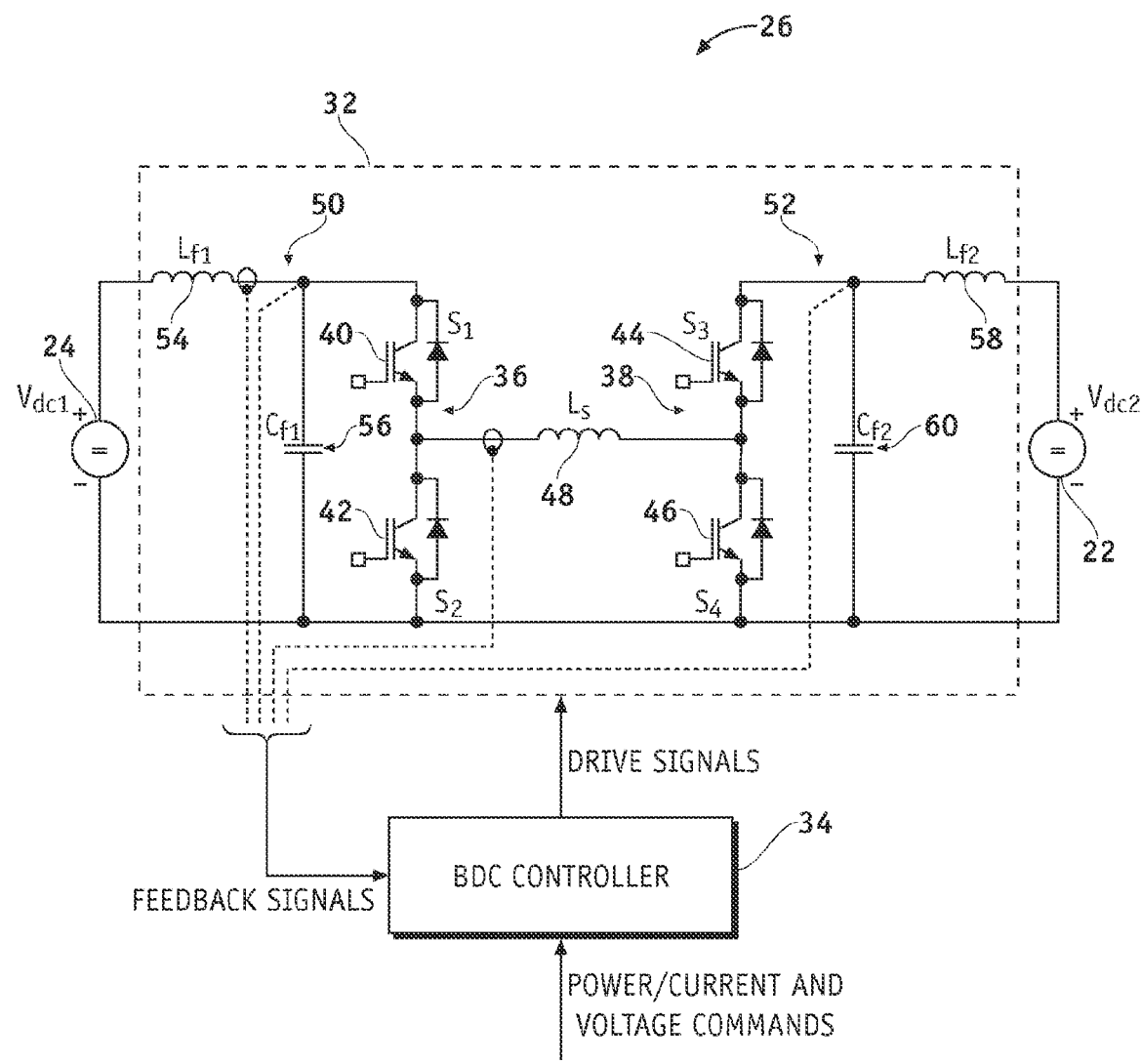
FIG. 2 is a schematic block diagram of the DC/DC converter system of FIG. 1.

FIG. 2 schematically illustrates the DC/DC converter system 26 in greater detail. The converter system 26 includes a bi-directional DC/DC converter (BDC) 32 and a BDC controller 34. The BDC 32, in the depicted embodiment, includes a power switching section with two dual insulated gate bipolar transistor (IGBT) legs 36 and 38, each having two IGBTs, 40 ($S_1$) and 42 ($S_2$), and 44 ($S_3$) and 46 ($S_4$), respectively. The two legs 36 and 38 are interconnected at midpoints thereof by a switching inductor 48 having an inductance ($L_S$). The BDC 32 also includes a first filter 50 connected to the positive rail of the first IGBT leg 36, and a second filter 52 connected to the positive rail of the second IGBT leg 38. As shown, the filters 50 and 52 include a first inductor 54, a first capacitor 56, a second inductor 58, and a second capacitor 60, respectively. The first IGBT leg 36 is connected to the FCPM 24 through the first filter 50, and the second IGBT leg 38 is connected to the battery 22 through the second filter 52. As shown, the FCPM 24 and the battery 22 are not galvanically isolated, as the negative (−) terminals thereof are electrically connected.

The BDC controller 34 is in operable communication with the BDC 32 as shown. Although illustrated as being a separate module, the BDC controller 34 may be implemented within the electronic control system 18 (shown in FIG. 1), as is commonly understood in the art.

Although not illustrated, in one embodiment, the inverter 28 includes multiple power module devices. The power module devices may each include a semiconductor substrate (e.g., silicon substrate) with an integrated circuit, having a plurality of semiconductor devices (e.g., transistors and/or switches), formed thereon, as is commonly understood.

Referring again to FIG. 1, the radiator 30 is connected to the frame at an outer portion thereof and although not illustrated in detail, includes multiple cooling channels therethough that contain a cooling fluid (i.e., coolant), such as water and/or ethylene glycol (i.e., "antifreeze), and is coupled to the motor 20 and the inverter 28. In one embodiment, the inverter 28 receives and shares coolant with the electric motor 20. The radiator 30 may be similarly connected to the DC/DC converter system 26, the inverter 28, and/or the electric motor 20.

The electronic control system 18 is in operable communication with the motor 20, the battery 22, the FCPM 24, the DC/DC converter system 26, and the inverter 28. Although not shown in detail, the electronic control system 18 includes various sensors and automotive control modules, or electronic control units (ECUs), such as the BDC controller 34 (shown in FIG. 2) and a vehicle controller, and at least one processor and/or a memory which includes instructions stored thereon (or in another computer-readable medium) for carrying out the processes and methods as described below.

During operation, still referring to FIG. 1, the vehicle 10 is operated by providing power to the wheels 16 with the electric motor 20 which receives power from the battery 22 and the FCPM 24 in an alternating manner and/or with the battery 22 and the FCPM 24 simultaneously. In order to power the motor 20, direct current (DC) power is provided from the battery 22 and the FCPM 24 to the inverter 28, via the DC/DC converter system 26, which converts the DC power into alternating current (AC) power, as is commonly understood in the art. If the motor 20 does not need full power, the FCPM 24 can use the extra power to charge the battery 22 via the DC/DC converter system 26.

Referring to FIG. 2, the DC/DC converter system 26 is digitally controlled, by the electronic control system 18 and/or the BDC controller 34, and transfers power between the FCPM 24 ($V_{dc1}$) and the battery 22 ($V_{dc2}$). The terminal voltages of the FCPM 24 and the battery 22 can dynamically vary so that $V_{dc1} \geq V_{dc2}$ or $V_{dc1} \leq V_{dc2}$. The power transfer between the two voltage sources takes place under constant current or under constant power independently of the voltaic relationship between the FCPM 24 and the battery 22.

Still referring to FIG. 2, the first and second filters 50 and 52 reduce electromagnetic interference (EMI) emissions, as will be appreciated by one skilled in the art. In one embodiment, the switching inductor 48 is primarily responsible for the power conversion process, as the switching inductor 48 stores energy in a first part of the operating cycle and releases it in a second part of the operating cycle, while ensuring that the energy transfer takes place in the desired direction, regardless of the voltaic relationship between the FCPM 24 and the battery 22.

A constant average current, equal to the desired average current, is impressed through the switching inductor 48. The control of the constant average current is generally performed under closed loop operation. The output of the current loop controls the voltage across the switching inductor 48 by switching the state of the IGBTs 40, 42, 44, and 44 ('ON' or 'OFF'). For example, in one embodiment, the IGBT (40 in the first leg 36 or 44 in the second leg 38) connected to the positive (+) terminal of the voltage source with the lower voltaic value is kept continuously 'ON' while the IGBTs on the opposing leg are switched 'ON'/'OFF' in order to achieve the power transfer. The rate of this switching may be referred to as the "switching frequency" ($f_{sw}$). The inverse, or reciprocal, of the switching frequency may be referred to as the "switching period" or "switching cycle" ($T_{sw}$). A switch, or IGBT 40-46, may be in the 'ON' state for a particular duration (i.e., an "on-period") within the switching period. The ratio of the 'ON' time of a particular switch divided by the switching period may be referred to as the "duty ratio" or "duty cycle."

In accordance with one aspect of the present invention, the control algorithm described below generates, and corrects, duty cycles of the four IGBT switches 40-46 ($S_1$-$S_4$) by means of software executed in the electronic control system 18. As will be appreciated by one skilled in the art, the control parameters within the electronic control system 18 may be easily altered to adjust the performance of DC/DC converter system 26.

As indicated in FIG. 2, the BDC controller 34 receives power/current and voltage commands from an outside source (e.g., the vehicle controller). The control algorithm within the BDC controller 34 generates duty cycles of the IGBTs 40-46 ($S_1$-$S_4$). The BDC controller 34 also performs feedback measurements that are compared to the power and voltage commands. The duty cycles of the drive signals sent by the BDC controller 34 are adjusted so that the feedback values of the BDC controller 34 substantially match the power and voltage commands.

Figure 3:
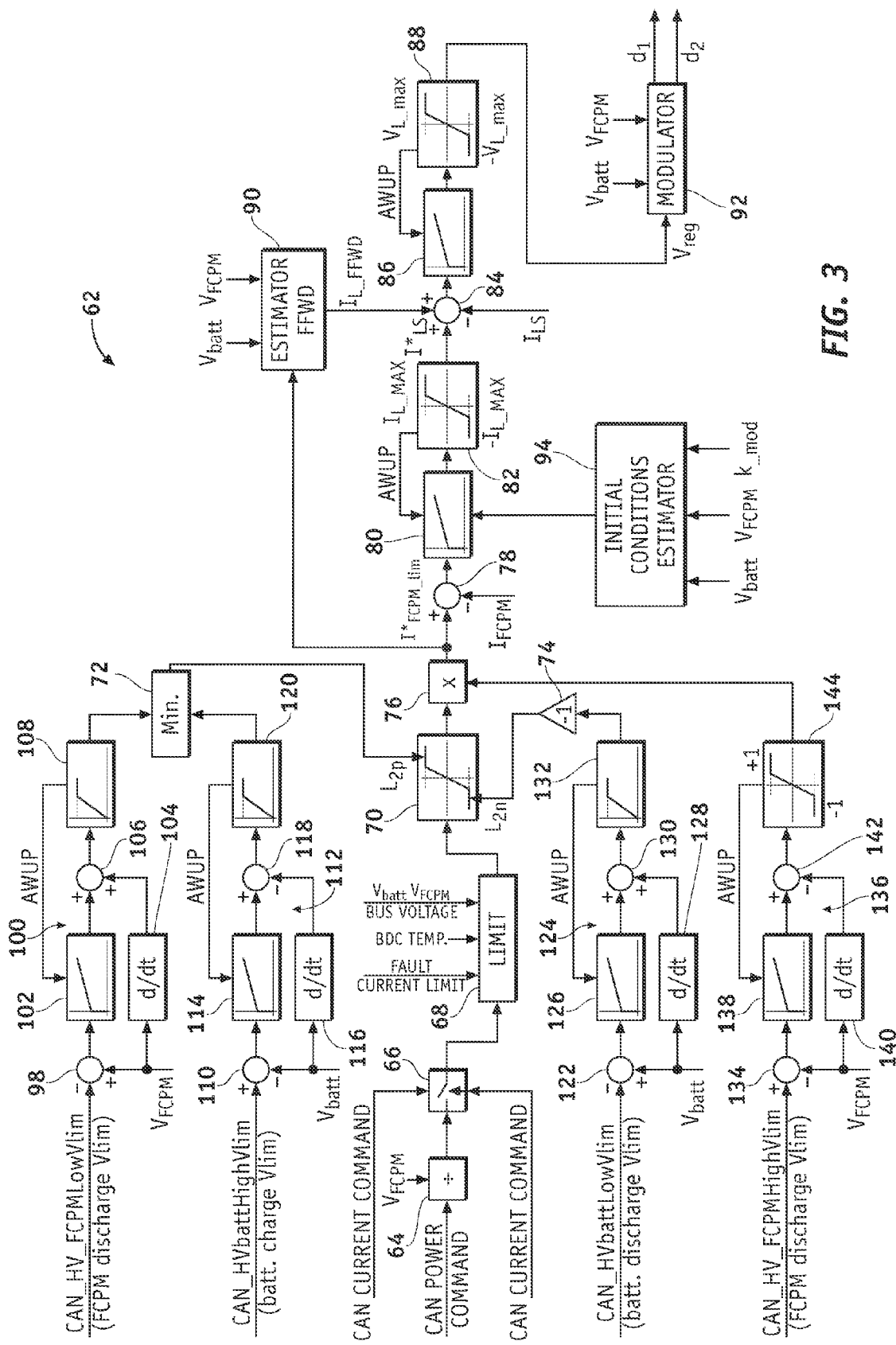
FIG. 3 is a block diagram of a method and/or system for operating the DC/DC converter system of FIG. 2.

FIG. 3 illustrates a system (and/or method) 62 for controlling the DC/DC converter system 26, according to one embodiment. As shown, the system 62 receives three drive signals, or command parameters, (a CAN current command, a CAN power command and a CAN command select) from the electronic control system 18 over a controller area network (CAN), which is not shown.

At block 64, the CAN power command, or an associated power value, is divided by the FCPM voltage ($V_{FCPM}$), which may be a measured voltage of the FCPM 24. The output of block 64 is a current command corresponding to the BDC 32 operating in power control mode. Block 66 (i.e., a CAN command switch) selects between the CAN current command and the output of block 64 based on the CAN command select signal, thus dictating the mode of operation of the BDC 32 (i.e., current control or power control).

The output of block 64 is the current reference signal, or desired current flow, ($I^*_{FCPM}$) for the fuel cell side of the DC/DC converter system 26. At block 68, the current reference ($I^*_{FCPM}$) is limited as, for example, a function of a sensed temperature within the DC/DC converter system 26, such as the heatsink temperature of the power circuitry, or as a function of the input voltage, in order to protect the functional integrity of the DC/DC converter system 26. For example, if the heatsink temperature is higher than a predetermined value, the current reference ($I^*_{FCPM}$) is progressively reduced to zero in a manner inversely proportional to the amount the sensed temperature exceeds the predetermined value. Likewise, if the BDC 32 input voltage is greater than a predetermined value, the maximum reference current ($I^*_{FCPM}$) is reduced proportionally to the excess voltage. Additionally, if the BDC 32 exhibits particular active faults during operation, the current reference ($I^*_{FCPM}$) will be reduced to zero at block 68 by the signal indicated as Fault current limit in FIG. 3.

The output of block 68 is sent to block 70 which further limits the current reference ($I^*_{FCPM}$). Block 70 utilizes a positive limit ($L_{2p}$) and a negative limit ($L_{2n}$) that are determined at blocks 72 and 74, respectively, as described in greater detail below. The current reference ($I^*_{FCPM\_lim}$) is sent to multiplier block 70, where it is again limited by block 144, as described below.

The output of block 76 is the limited current reference of the fuel-cell side input ($I^*_{FCPM\_lim}$). A measured fuel cell current ($I_{FCPM}$) is subtracted from this reference value at summer (or summation circuit) 78 to generate a "present" FCPM current error. That is, summer 78 calculates a difference (i.e., error) between limited current reference ($I^*_{FCPM\_lim}$) and the actual, measured amount of current flowing from the FCPM 24 ($I_{FCPM}$).

The current error is sent to a first proportional integral, or integration, (PI) controller 80. As will be appreciated by one skilled in the art, the first PI controller 80, as well as the PI controllers described below, is a feedback loop component that takes a measured value (or output) from a process or other apparatus and compares it with a set, or reference, value. The difference (or "error" signal) is then used to adjust an input to the process in order to bring the output to its desired reference value. The PI controllers include a proportional and an integral term. The proportional term is used to account for the "immediate" or present error, which is multiplied by a constant. The integral term integrates the error over a period of time and multiplies the integrated sum by another constant.

As such, the first PI controller 80 receives the present current error from summer 78 and generates a signal that is representative of a combination of the present current error and the current error over a period of time.

The first PI controller 80 implements an anti-wind-up (AWUP) feedback scheme to improve transient operation when output is limited by limiter block 82. The limits set by block 82 are equal to the positive and negative values of the maximum permissible inductor current ($+I_{L\_max}$ and $-I_{L\_max}$).

The output of block 82 ($I^*_{Ls}$) constitutes the reference current value for the switching inductor 48 current loop with the limits stated above. That is, the output of block 82 ($I^*_{Ls}$) may be considered to be a signal that represents a desired current flow, or more precisely a desired change in the current flow through the switching inductor 48, that is based on the current error calculated by summer 78.

The reference current value for the switching inductor 48 ($I^*_{Ls}$) is sent to summer 84. Summer 84 also receives a feedforward term ($I_{L\_FFWD}$) from block 90 and an actual, measured current flow ($I_{LS}$) through the switching inductor 48.

The feedforward term ($I_{L\_FFWD}$) is an estimation of the current flowing through the switching inductor 48 as a function of the current ($I_{FCPM}$) for the fuel cell side of the DC/DC converter system 26, which improves the response time of the inductor current loop when the input command is changed. When the system is in the current control mode, the fuel cell current ($I_{FCPM}$) is equal to the reference value ($I^*_{FCPM\_lim}$).

The estimation ($I_{L\_FFWD}$) of the current flowing through the switching inductor 48 is performed assuming that the IGBT leg corresponding to the lower of the two input voltage sources ($V_{FCPM}$ or $V_{batt}$) is not switched and the upper IGBT is 'ON' continuously, and that the BDC 32 losses are negligible.

Referring now to FIG. 2 in combination with FIG. 3, under the conditions stated above, if $V_{FCPM} \leq V_{batt}$, switch 40 ($S_1$) is 'ON' and the switching inductor 48 ($L_s$) average current value is equal to $I_{FCPM}$.

$$I_{Ls} = I_{FCPM} \quad (1)$$

If $V_{FCPM} > V_{batt}$, switch 44 ($S_3$) is 'ON' continuously and the switching inductor 48 ($L_s$) average current value is equal to the current ($I_{batt}$) of the voltage source ($V_{batt}$).

$$I_{Ls} = I_{batt} \quad (2)$$

Because it is assumed that losses within the BDC 32 are negligible, the input power of the BDC 32 will be equal to the output power of the BDC 32. That is, $$V_{FCPM} \cdot I_{FCPM} = V_{batt} \cdot I_{batt} \quad (3)$$

Consequently, from Equations (2) and (3), when $V_{FCPM} > V_{batt}$, $$I_{Ls} = I_{batt} = I_{FCPM} \cdot V_{FCPM} / V_{batt} \quad (4)$$

The calculations described above are performed at block 90, which receives the reference value ($I^*_{FCPM\_lim}$) from block 76, along with the measured FCPM 24 voltage ($V_{FCPM}$) and a measured battery 22 voltage ($V_{batt}$), as inputs to calculate, or estimate, the feedforward term ($I_{L\_FFWD}$).

Referring to FIG. 3, summer 84 adds the feedforward term ($I_{L\_FFWD}$) to the reference current value for the switching inductor 48 ($I^*_{Ls}$) and subtracts the measured inductor current flow ($I_{Ls}$) to calculate a present inductor current error. The present inductor current error is sent to a second PI controller 86 that generates a signal that is representative of a combination of the present inductor current error and the inductor current error over a period time, in a fashion similar to the first PI controller 80 described above.

The output of the second PI controller 86 is limited by limiter block 88 to the positive and negative values of the maximum allowable voltage across the switching inductor 48 ($+V_{L\_max}$ and $-V_{L\_max}$). As with the first PI controller 80, an anti-wind-up (AWUP) scheme is used to limit the value of the integral component of the second PI controller 82 to the difference between the limited output of block 88 and the proportional component added to the feedforward term ($I_{L\_FFWD}$).

The output ($V_{reg}$) of block 88 represents the commanded voltage across the inductor 48. That is, the output ($V_{reg}$) of block 88, may be considered to be a signal that represents a desired voltage, or more precisely a desired change in voltage, across the switching inductor 48 that is based on the error inductor current error calculated by summer 84.

The commanded voltage across the inductor 48 ($V_{reg}$) is sent to modulator block 92. Block 92 calculates the duty cycles for the IGBT switches 40-46 ($S_1$-$S_4$). The duty cycles may be expressed as $$d_1 = k_{mod} + V_{reg}/V_{FCPM} \text{ and} \quad (5)$$

$$d_2 = k_{mod} - V_{reg}/V_{batt} \quad (6)$$

where $k_{mod}$ is a constant close to 1. Duty cycle $d_1$ controls switches 40 and 42 ($S_1$ and $S_2$), and duty cycle $d_2$ controls switches 44 and 46 ($S_3$ and $S_4$).

Ideally, $k_{mod}$ is equal to 1 in order to maximize the voltage of the midpoints of the two IGBT legs 36 and 38 at which the power transfer takes place and thus increase the efficiency of the conversion process. However, it should be noted that the value of $k_{mod}$ may be, for example, approximately 0.98 in order to allow for a regulation voltage margin that will account for errors in the voltage measurement and other imperfections in the particular equipment that is used, as will be appreciated by one skilled in the art.

The BDC controller 34 also inserts a lock-out time (dead-time) between the gate commands of the two switches of the same leg in order to prevent simultaneous conduction (or cross-conduction) of the switches due to inherent activation delays. The dead-time introduces errors in the actual average voltage on the switching inductor 48. For this reason, the modulator block 92 performs a duty cycle dead-time compensation as a function of the inductor current direction in order to achieve a correct reproduction of the commanded voltage ($V_{reg}$) across the switching inductor 48.

The system and/or method 62 also impresses the correct amount of voltage across the switching inductor 48 at the initiation of the DC/DC converter system operation. If the correct voltage is not impressed, a large current spike may appear through the inductor 48 because the FCMP 24 ($V_{FCPM}$) and the battery 22 ($V_{batt}$) are interconnected by the low impedance of the switching inductor 48 ($L_S$). Thus, the duty cycles that are to be used during start-up are calculated to impress a "zero" initial voltage across the switching inductor 48. Since these duty cycles are controlled by the output of the second PI controller 86, the commanded voltage ($V_{reg}$) is calculated to satisfy the initial zero current condition.

In order to perform this calculation, at block 94 (i.e., initial conditions estimator), the initial value of the integral component of the second PI controller 86 is calculated. The average voltage across switch 42 ($S_2$) may be expressed as $$V_{S2} = d_1 \cdot V_{FCPM} = k_{mod} \cdot V_{FCPM} + V_{reg} \quad (7)$$

and the average voltage across switch 46 ($S_4$) may be expressed as $$V_{S4} = d_2 \cdot V_{batt} = k_{mod} \cdot V_{batt} - V_{reg} \quad (8)$$

When there is no voltage across the inductor 48, the voltage across switch 42 (S2) and switch 46 (S4) are equal (i.e., $V_{S2} = V_{S4}$). Thus, $$k_{mod} \cdot V_{FCPM} + V_{reg} = k_{mod} \cdot V_{batt} - V_{reg} \quad (9)$$

Equation 9 may be simplified as $$V_{reg} = k_{mod} \cdot (V_{batt} - V_{FCPM})/2. \quad (10)$$

Figure 4:
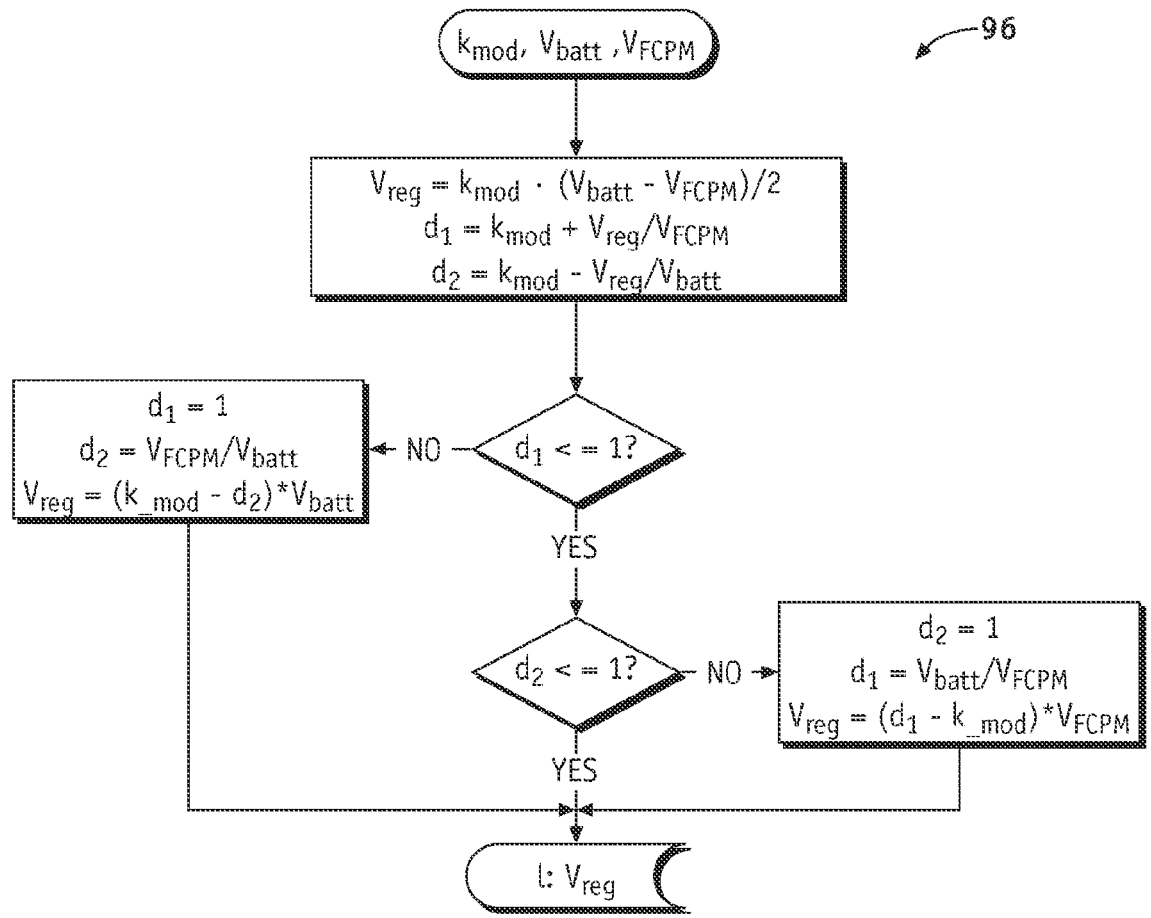
FIG. 4 is a block diagram illustrating a method for calculating an integral component of a proportional integral controller within the method and/or system of FIG. 3.

The value $V_{reg}$ is impressed on the integral component of the second PI controller 86 as an initial condition during start-up. FIG. 4 illustrates a method 96 for calculating $V_{reg}$ and the integral component of the second PI controller 86, as performed at block 94. As shown, Equation 10 correctly calculates the initial value of the integral component if duty cycle saturation is not present (i.e., $d1 \leq 1$ or $d2 \leq 1$).

Referring again to FIG. 3, the system and/or method 62 also limits the minimum or maximum voltage levels for at its inputs at required levels. As shown, a FCPM discharge voltage limit value (CAN_HV_FCPMLowVlim), a battery charge voltage limit value (CAN_HVbattHighVlim), a battery discharge voltage limit value (CAN_HVbattLowVlim), and a FCPM charge voltage limit value (CAN_HV_FCPMHighVlim) are sent from the electronic control system 18 (FIG. 1). The voltage limit signals are used to limit the charging and discharging levels of the two voltage sources $V_{FCPM}$ and $V_{batt}$.

The FCPM discharge voltage limit value (CAN_HV_FCPMLowVlim) is subtracted from the actual FCPM voltage ($V_{FCPM}$) by summer 98 and the resulting error signal is sent to a third PI, or "PID," controller 100 formed by blocks 102 and 104 and summer 106. As will be appreciated by one skilled in the art, the third PI controller may also include a derivative term, and as such, may be known as a proportional-integral-derivative (PID) controller.

The output of the third PID controller 100 is then limited between zero and the maximum allowable FCPM current ($I_{FCPM\_max}$) at block 108. If the measured FCPM voltage ($V_{FCPM}$) is lower than the FCPM discharge voltage limit (CAN_HV_FCPMLowVlim), the output of the third PID controller 100 saturates to the maximum allowable FCPM current ($I_{FCPM\_max}$). If the measured FCPM voltage ($V_{FCPM}$) is higher than the FCPM discharge voltage limit (CAN_HV_FCPMLowVlim), the output of the third PID controller 100 is progressively reduced towards zero.

In a similar manner, the battery charge voltage limit (CAN_HVbattHighVlim) is controlled by comparing CAN_HVbattHighVlim to the measured voltage of the battery ($V_{batt}$) using summer 110 and a fourth PI (or PID) controller 112 formed by blocks 114 and 116 and summer 118. The output of summer 118 is limited between zero and the maximum allowable FCPM current ($I_{FCPM\_max}$) at block 120.

As briefly mentioned above, block 72 selects the minimum of the two output values of blocks 108 and 120 and applies it as the positive limit ($L_{2p}$) of block 70. Thus, the commanded FCPM current will be reduced if either of the voltage limits from block 108 or block 120 is reached.

Still referring to FIG. 3, summer 122 receives the battery discharge voltage limit value (CAN_HVbattLowVlim) and the measured voltage of the battery ($V_{batt}$) as inputs. Summer 122, a fifth PID controller 124 (including blocks 126 and 128 and summer 130), limiting block 132, and negative block 74 operate in a similar manner as above to control the negative limit ($L_{2n}$) and achieve battery discharge control.

Likewise, summer 134, a sixth PID controller 136 (including blocks 138 and 140 and summer 142), and limiting block 144 control the FCPM charge voltage limit value (CAN_HV_FCPMHighVlim). As the FCPM bus is pre-charged before the FCPM is connected, the system and/or method 62 allows operation at no-load and performs as a true voltage source (i.e., zero impedance or resistance) rather than a voltage limiter.

The output of the sixth PID controller 136 is limited by block 144 between +1 and −1 and then sent to multiplier block 76. The commanded FCPM current at the output of block 144 may thus change sign (i.e., between positive and negative) to allow the system and/or method 62 to source and sink current within the limits of the commanded current. This mode of operation will allow the DC/DC converter system 26 to maintain the voltage on the FCPM input at the value prescribed by the FCPM charge voltage limit value (CAN_HV_FCPMHighVlim).

One advantage of the system and/or method described above is that the duty cycles for the transistors within the DBC can be adjusted based on the desired performance of the DBC, along with the other components of the vehicle, without changing any of the hardware within the DC/DC converter system. As a result, the DC/DC converter system may be used in multiple types of vehicles, thus reducing the costs of manufacturing the vehicles while maintaining optimum performance.

Other embodiments may utilize the method and system described above in different types of automobiles, or in different electrical systems altogether, as it may be implemented in any situation where the voltages of the two sources dynamically change over a wide range. For example, in another embodiment, the battery could be replaced by an ultra-capacitor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a power converter comprising an electrical component, a first switch coupled to a first voltage source, and a second switch coupled to a second voltage source, the method comprising:
receiving a signal representative of a desired current flow through the electrical component;
generating a signal representative of a difference between the desired current flow and an actual current flow through the electrical component;
calculating a first duty cycle for the first switch based on the signal representative of the difference and a first voltage generated by the first voltage source; and
calculating a second duty cycle for the second switch based on the signal representative of the difference and a second voltage generated by the second voltage source.

2. The method of claim 1, further comprising:
receiving a signal representative of a desired current flow from at least one of the voltage sources;
determining an actual current flow from the at least one of the voltage sources; and
generating the signal representative of the desired current flow through the electrical component based on a difference between the desired current flow from the at least one of the voltage sources and the actual current flow from the at least one of the voltage sources.

3. The method of claim 2, wherein the calculating of the duty cycle for the switch comprises dividing the difference between the desired current flow and the actual current flow through the electrical component by the voltage generated by the voltage source.

4. The method of claim 3, wherein the calculating of the second duty cycle for the second switch comprises dividing the difference between the desired current flow and the actual current flow through the electrical component by the second voltage generated by the second voltage source.

5. The method of claim 4, further comprising estimating the current flow through the electrical component based on the desired current flow from the at least one of the voltage sources, the voltage generated by the voltage source, and the second voltage generated by the second voltage source.

6. The method of claim 5, wherein the generating of signal representative of the difference between the desired current flow and the actual current flow through the electrical component is based on the estimating of the current flow through the electrical component.

7. The method of claim 6, further comprising generating the signal representative of the desired current flow from the at least one of the voltage sources and wherein the generating of the signal representative of the desired current flow from the at least one of the voltage sources comprises limiting the desired current flow from the at least one of the voltage sources based on at least one of a discharge voltage limit of the voltage source, a charge voltage limit of the voltage source, a discharge voltage limit of the second voltage source, and a charge voltage limit of the second voltage source.

8. The method of claim 7, wherein the generating of the signal representative of the difference between the desired current flow and the actual current flow through the electrical component and the generating of the signal representative of the desired current flow through the electrical component are performed using proportional integral controllers.

9. The method of claim 8, wherein the power converter is an automotive direct current-to-direct current (DC/DC) power converter, the electrical component is an inductor, and the switch and the second switch are transistors.

10. A method for operating an automotive direct current-to-direct current (DC/DC) power converter comprising an electrical component and first and second switches coupled to respective first and second voltage sources, the method comprising:
   receiving a signal representative of a desired current flow from at least one of the first and second voltage sources;
   determining an actual current flow from the at least one of the voltage sources;
   generating a signal representative of a desired current flow through the electrical component based on a difference between the desired current flow from the at least one of the voltage sources and the actual current flow from the at least one of the voltage sources;
   determining an actual current flow through the electrical component;
   generating a signal representative of a difference between the desired current flow through the electrical component and the actual current flow through the electrical component;
   calculating a first duty cycle for the first switch based on the signal representative of the difference between the desired current flow through the electrical component and the actual current flow through the electrical component and a first voltage generated by the first voltage source; and
   calculating a second duty cycle for the second switch based on the signal representative of the difference between the desired current flow through the electrical component and the actual current flow through the electrical component and a second voltage generated by the first voltage source.

11. The method of claim 10, wherein the calculating of the duty cycle for the first switch comprises dividing the difference between the desired current flow and the actual current flow through the electrical component by the first voltage generated by the first voltage source and the calculating of the duty cycle for the second switch comprises dividing the difference between the desired current flow and the actual current flow through the electrical component by the second voltage generated by the second voltage source.

12. The method of claim 11, further comprising estimating the current flow through the electrical component based on the desired current flow from the at least one of the first and second voltage sources, the first voltage, and the second voltage, and wherein the generating of the signal representative of the difference between the desired current flow and an actual current flow through the electrical component is based on the estimating of the current flow through the electrical component.

13. The method of claim 12, further comprising generating the signal representative of the desired current flow from the at least one of the first and second voltage sources and wherein the generating of the signal representative of the desired current flow from the at least one of the first and second voltage sources comprises limiting the desired current flow from the at least one of the first and second voltage sources based on at least one of a discharge voltage limit of the first voltage source, a charge voltage limit of the first voltage source, a discharge voltage limit of the second voltage source, and a charge voltage limit of the second voltage source.

14. The method of claim 13, wherein the first voltage source is a battery and the second voltage source is a fuel cell and the first and second switches are insulated gate bipolar transistors (IGBTs).

15. An automotive drive system comprising:
   a power converter configured to be coupled to a first voltage source and a second voltage source, the power converter comprising first and second switches and an inductor; and
   a microprocessor in operable communication with the power converter, the microprocessor being configured to:
      receive a signal representative of a desired current flow through the inductor;
      generate a signal representative of a difference between the desired current flow and an actual current flow through the inductor; and
      calculate respective first and second duty cycles for the first and second switches based on the signal representative of the difference and respective first and second voltages generated by the first and second voltage sources.

16. The automotive drive system of claim 15, wherein the microprocessor is further configured to:
   receive a signal representative of a desired current flow from at least one of the first and second voltage sources;
   determine an actual current flow from the at least one of the first and second voltage sources; and
   generate the signal representative of the desired current flow through the inductor based on a difference between the desired current flow from the at least one of the first and second voltage sources and the actual current flow from the at least one of the first and second voltage sources.

17. The automotive drive system of claim 16, wherein the generating of the signal representative of the difference between the desired current flow and an actual current flow through the inductor is performed using a proportional integral controller.

18. The automotive drive system of claim 17, wherein the calculating of the first duty cycle comprises dividing the difference between the desired current flow and the actual current flow through the inductor by the first voltage and the calculating of the second duty cycle comprises dividing the difference between the desired current flow and the actual current flow through the inductor by the second voltage.

19. The automotive drive system of claim 18, wherein the power converter is a direct current-to-direct current (DC/DC) power converter, and the first voltage source is a battery and the second fuel source is a fuel cell.

* * * * *